United States Patent
Focke et al.

[11] Patent Number: 6,022,187
[45] Date of Patent: Feb. 8, 2000

[54] DEVICE FOR HANDLING STACKS OF BLANKS

[75] Inventors: Heinz Focke, Verden; Harald Freudenberg, Marklohe, both of Germany

[73] Assignee: Focke & Co., Verden, Germany

[21] Appl. No.: 08/852,408

[22] Filed: May 7, 1997

[30] Foreign Application Priority Data

May 8, 1996 [DE] Germany .............. 196 18 344

[51] Int. Cl.[7] ............................................. B65G 59/004
[52] U.S. Cl. ...................... 414/797; 294/64.1; 414/793
[58] Field of Search ............... 294/64.1; 414/792.9, 414/793, 796, 797, 627, 752

[56] References Cited

U.S. PATENT DOCUMENTS

| | | | |
|---|---|---|---|
| 2,716,497 | 8/1955 | Wahl et al. | 414/792.9 X |
| 2,920,916 | 1/1960 | Pagdin | 414/792.9 X |
| 4,911,608 | 3/1990 | Krappitz et al. | 414/796 |
| 5,088,878 | 2/1992 | Focke et al. | 414/793 X |
| 5,190,430 | 3/1993 | Neri et al. | 414/797 X |
| 5,238,355 | 8/1993 | Boldrini et al. | 414/797 |
| 5,340,263 | 8/1994 | Neri et al. | 414/797 X |

FOREIGN PATENT DOCUMENTS

| | | |
|---|---|---|
| 581188 | 2/1994 | European Pat. Off. . |
| 629573 | 12/1994 | European Pat. Off. . |
| 2617078 | 12/1988 | France . |
| 3835032 | 4/1990 | Germany . |
| 4222609 | 1/1994 | Germany . |
| 4434866 | 4/1996 | Germany . |
| 61-238614 | 10/1986 | Japan ...................... 414/793 |

*Primary Examiner*—Janice L. Krizek
*Attorney, Agent, or Firm*—Sughrue, Mion, Zinn, Macpeak & Seas, PLLC

[57] ABSTRACT

Stacks of blanks (10) for cigarette packets and other types of application are delivered on pallets (19). The stacks of blanks (10) are arranged in rows (20) and layers (21) on the pallet (19). A depalletizing device (25) is provided to empty the pallet (19), on the articulated arm (28) of which device a pick-up head (29) is arranged for grasping and handling one stack of blanks at a time. The pick-up head (29) is fitted with two holding jaws (30, 31), positioned at a right angle to one another and which grasp the stack of blanks (10) on two adjacent upright surfaces, namely a side surface (11) and an end sumrface (14), and hold them by suction air.

4 Claims, 6 Drawing Sheets

DEVICE FOR HANDLING STACKS OF BLANKS

BACKGROUND OF THE INVENTION

The invention relates to a device for picking up and carrying away stacks of blanks arranged one above the other, especially for the fabrication of hinge-lid packets for cigarettes, a plurality of stacks of blanks being positioned in rows beside one another on a base and preferably layers formed of a plurality of rows being arranged one above the other, preferably on a pallet, and in addition, for picking up preferably individual stacks of blanks, a pick-up head disposed on a swivelling arm gripping the stack of blanks and depositing it on a conveyor.

The cigarette industry with its efficient packaging machines is dependent on reliable and likewise efficient devices and units for handling the packaging material. The widely used hinge-lid packets are manufactured from blanks which are produced elsewhere and which are delivered as stacks of blanks, mostly on pallets. The invention relates to emptying the pallets, i.e. to picking up the stacks of blanks from the pallet and passing them on to the packaging machine or to a store or conveyor for the stacks of blanks.

The purpose underlying the invention is to propose a handling device for stacks of blanks which with great efficiency takes the stacks of blanks from the pallet or a base, lifts them up and deposits them in a suitable place.

In fulfilment of this purpose, the device according to the invention is characterised in that the pick-up head of the handling device has two holding jaws which come into contact with free, adjoining side surfaces of the stack of blanks and grip and hold the latter solely by suction.

Whereas, on previous devices for handling stacks of blanks, a tongue-like, thin-walled holding or gripping member is always driven underneath the stack of blanks, the mode of operation of the pick-up head according to the invention rests on the fact that the (individual) stack of blanks is solely gripped and held on upright side surfaces, and this by suction air, i.e. vacuum.

To this end, the pick-up head is equipped with two upright holding jaws arranged at a right angle to one another and which, when the pick-up head is in a receiving position, are driven by a corresponding movement, preferably individually and in succession, against associated upright side surfaces of the stack of blanks. When these holding jaws rest against the stack of blanks, vacuum is created via suction holes in the region of the bearing surfaces of the holding jaws. In this way, the stack of blanks which is formed of blanks stacked very closely together is fixed on the two holding jaws. The pick-up head can now be lifted up with the stack of blanks and driven to deposit same.

Additional features of the invention relate to the design of the pick-up head, especially of the holding jaws, as well as to members for controlling the necessary movements of the pick-up head. An embodiment, given by way of example, of the device according to the invention is described in greater detail below with the aid of the drawings. These show:

DESCRIPTION OF PREFERRED EMBODIMENTS

Figure 1:
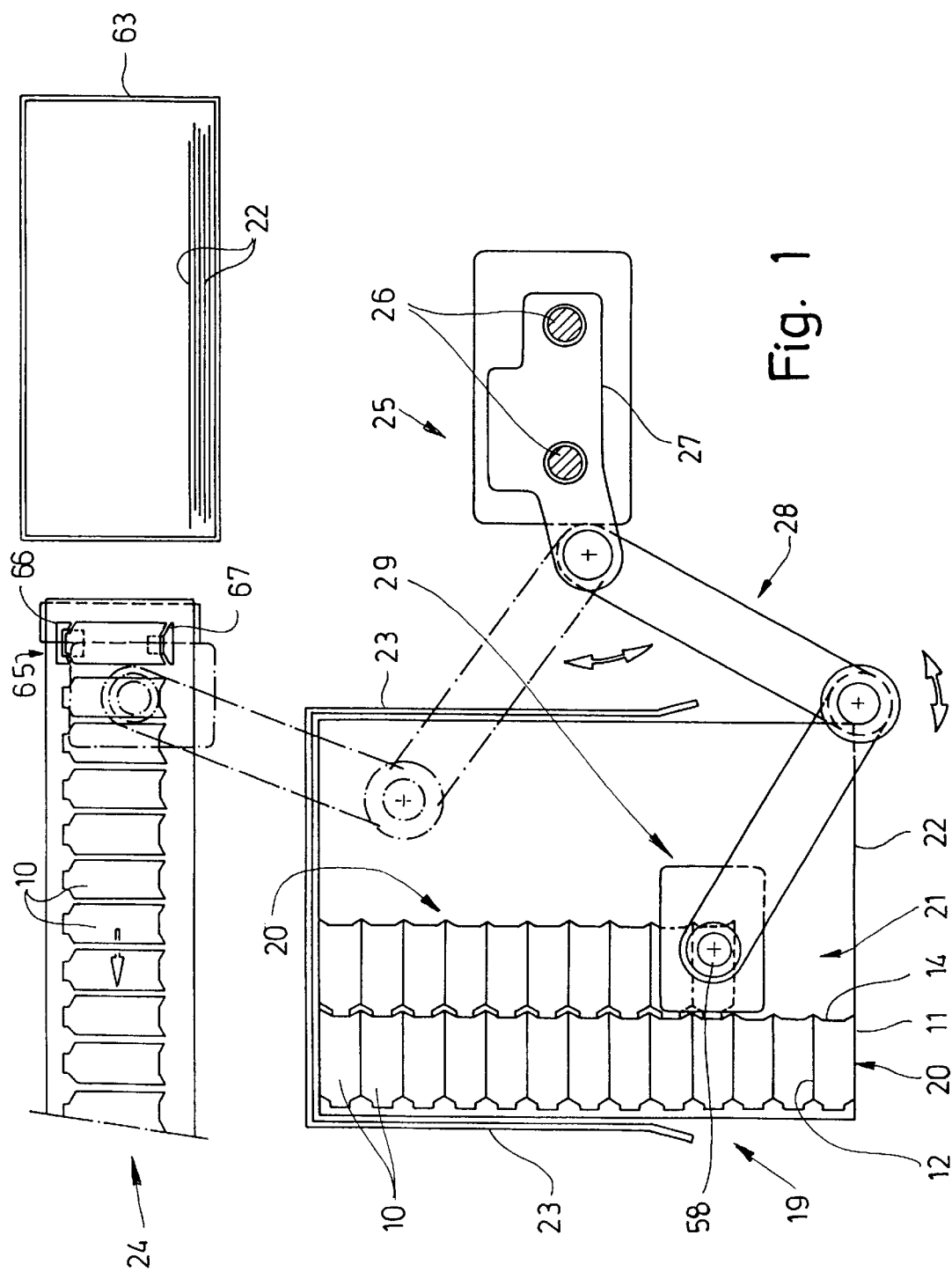
FIG. 1 a device for handling stacks of blanks in diagrammatic plan view.

The present preferred embodiment, given by way of example, is concerned with the handling of stacks of blanks 10, each stack being formed from a large number of blanks made of thin cardboard. The blanks in a stack 10 have corresponding outline shapes, so that the stacks of blanks form relatively flat-surfaced, compact side surfaces, namely side surfaces 11 and 12, as well as head surfaces 13 and end surfaces 14.

The stacks of blanks 10 consist in the present case of blanks for the fabrication of hinge-lid packets for. cigarettes. This widely used type of packet, because of its construction, gives rise to a special characteristic contour of the blanks. The side surfaces 11, 12, forming longitudinal edges of the blanks, are straight with narrow perforations and recesses which are not recognizable in the drawings for the sake of simplicity. What is characteristic is the head surface 13 of the stacks of blanks 10, because of a projecting lid inner flap 15 of the blanks and adjoining sloping edges 16. On the finished hinge-lid packet, the lid inner flap 15 adjoins the inside of a lid front wall. The sloping edges 16 form usual sloping edges of the hinge-lid packet in the region of a closing edge.

The opposite end surface 14 is also designed characteristically on this type of blank, namely likewise with sloping edges 17 and a central transverse edge 18 connecting the two sloping margin edges 17. The edges 17,18 mentioned form a trapezoid recess. This also defines the shape of the end surface 14 of the stack of blanks, namely with a trapezoid depression.

The stacks of blanks 10 are delivered on a base, in the present case on a pallet 19. The stacks of blanks 10 are positioned in a plurality of rows 20 lying closely beside one another on said pallet. The stacks of blanks 10 are aligned in a row 20 in the same direction and adjoin one another with their side surfaces 11, 12. Neighbouring rows abut against one another at the head surfaces 13 and end surfaces 14 of the stacks of blanks 10. The stacks of blanks 10 are aligned from row 20 to row 20.

A plurality of rows forms a layer 21. The pallet 19 is filled with a plurality of layers 21 arranged the one above the other. Continuous, enclosed intermediate layers 22, made of paper, foil or the like, are disposed between the layers.

To unload the pallet 19, the latter is placed in a holding device 23 which is U-shaped in outline. This device holds the side surfaces of the pallet 19 in partial regions.

For further processing, the stacks of blanks 10 are taken, individually and in succession, from the pallet 19 and passed on to a conveyor 24. The latter is a conveyor belt on which the stacks of blanks 10 lie at small distances from one another and with their length transverse to the direction of conveying. The conveyor 24 transports the stacks of blanks to the packaging machine or to an (interim) store.

A preferably fixed depalletizing device 25 serves to unload the pallet 19. This device is designed like a kind of automatically-operating robot. A carrying piece 27 may be moved up and down on stationary upright support pillars 26.

An articulated arm 28 is, in turn, pivotably attached on the carrying piece 27. At the end of the two-part pivot arm, there is located a grab or pick-up head 29 to grip one stack of blanks 10 at a time. The pick-up head 29 is arranged to rotate at the end of the articulated arm 28. Due to the mobility of the latter, and to the up and down movement of the carrying piece 27, the pick-up head 29 can be driven to each position in the region of the pallet 19 in order to receive a stack of blanks 10.

The pick-up head 29 is provided with at least two holding members for grasping a stack of blanks, which members adjoin free upright side surfaces of the stack of blanks 10 and fix the latter by means of suction air, i.e. vacuum, to the holding members. The holding members extend approximately over the whole height of the stack of blanks 10, but at least to the lower bearing plane of the stacks of blanks.

On the embodiment, given by way of example and shown here, the pick-up head 29 is equipped with two upright holding jaws 30,31, disposed cornerwise, i.e. standing at a right angle to one another. The latter are inserted in such a way that they come into contact respectively with two adjoining upright surfaces of the stack of blanks 10. In the present embodiment, the stacks of blanks 10 are so positioned on the pallet 19 that the rows 20 with the trapezoid end surface 14 face the depalletizing device 25. A first holding jaw 30 comes, therefore, into contact with the free side of the stack of blanks 10, i.e. with the end surface 14. The other holding jaw 31 is allocated to a second free surface of the stack of blanks 10, namely the side surface 11.

The holding jaws 30, 31 are moved until they are in contact with the associated surfaces of the stack of blanks 10. Then vacuum is applied to the regions of the holding jaws 30, 31, or portions of same, adjoining the stack of blanks 10, by which means the stacks of blanks are fixed to the holding jaws 30, 31. The pick-up head 29 can now be lifted, taking the stack of blanks 10 with it, and moved to the conveyor 24.

The holding jaw 30 facing the end surface 14 is configured trapezoid in cross-section to correspond to the contour of the stack of blanks 10. A central holding surface 32 comes into contact with the region of the end surface 14 formed by the transverse edges 18. of the blanks. Sloping surfaces 33 adjoin the corresponding side regions of the end surface 14 formed by the sloping edges 17. The holding jaw 30 thus adjoins the end surface as a form-fit and in an adjusting manner.

Only a partial region of the surface of the holding jaw 30 facing the stack of blanks 10 is set up to create the holding force by means of vacuum, namely the central holding surface 32. Suction apertures 34, which are connected to a suction channel 35, open into this surface. The channel is connected in turn with a suction pipe 36. The suction region is sealed off from the outside by profiled joints 37 inserted in the surface of the holding jaw 30 (when in contact with the stack of blanks 10). The resilient profiled joints 37 delimit a vacuum region of the holding jaw 30. The profiled joints 37 expediently project slightly over the plane of the holding jaw 30.

The holding jaw 31 allocated to the side surface 11 is provided with a flat bearing surface 38. This adjoins side surface 11 to receive a stack of blanks 10.

A partial region of the bearing surface 38 is configured as a suction surface 39. In the region of same, free suction apertures are formed, a plurality of suction slits 40 in the present case. The latter are connected to a common vacuum pipe 41. The suction surface 39, i.e. the region of the suction slits 40, is surrounded roundabout or at the side and above by a profiled joint 42, creating an effect such as is described in connection with holding jaw 30. The suction surface 39 extends as far as the lower edge of the holding jaw 31, so that the stack of blanks 10 is held down to the lower blank by the suction force. The height of the suction surface 39 can be lower than that of the stack of blanks 10.

In order to pick up a stack of blanks 10, the pick-up head 29 is lowered by the depalletizing device 25 until the holding jaws 30, 31 are resting on a lower surface. In the present case, the latter is an exposed region of an intermediate layer 22. Alternatively, the holding jaws 30, 31 can be placed on the free upper side of a lower layer 21 of stacks of blanks 10. In picking up a first stack of blanks 10 positioned on the edge or the corner of a layer 21 (example according to FIG. 3), the holding jaw 30 is only placed on a protuberant edge region of the intermediate layer 22 to define the height adjustment of the pick-up head 29. The other holding jaw 31 is thus automatically adjusted in respect of its height.

In this lower initial position, both holding jaws 30, 31 are arranged at a distance from the stack of blanks 10 which is to be picked up. Holding jaw 30 is now driven towards the associated end surface 14 of the stack of blanks 10, this being effected by a corresponding movement of the whole pick-up head 29 in a horizontal plane. The stack of blanks 10 is brought into line by the contact of the profiled holding jaws 30 with the end surface 14. Now, holding jaw 31 is moved by a transverse movement towards the side surface 11 of the stack of blanks 10.

To this end, holding jaw 31 is mounted on the pick-up head 29 so as to be horizontally adjustable. In the present case, two transverse guide rods 43 are arranged on holding jaw 31 on a free end outside the region of the stack of blanks 10. These guide rods are mounted in holes in a carrying piece 44 so as to be movable on the free reverse side of holding jaw 30. A pneumatic cylinder 45, which is likewise connected to the reverse side of holding jaw 30 via a carrying device, serves to carry out the transverse movements of holding jaw 31. A piston rod 46 of cylinder 45 is connected to a shoulder on holding jaw 31.

Once both holding jaws 30, 31 are in contact with the allocated surfaces of the stack of blanks 10, vacuum is passed to the surface regions provided. The stack of blanks 10 is now fixed to the pick-up head 29 and can be lifted from the base.

In order to ensure that all the lower blanks of the stack 10 are grasped securely, a pressure member is attached to the pick-up head 29, by means of which pressure is applied from above as a stack of blanks 10 is being picked up, namely until the latter is lifted from the intermediate layer 22. In the present case, this pressure member is a spring-mounted pressure plate 47. The latter is attached to a non-swivelling piston rod 48 of a pneumatic actuating cylinder 49. This cylinder sits in turn on the underside of a support plate 50 of the pick-up head 29. The pressure plate 47 is mounted resiliently via springs 51, namely able to be displaced in an upwards direction against elastic pressure, on a holding plate at the lower end of the piston rod 48. By means of the downward travel of the piston rod 48, the pressure plate 47 is lowered, creating elastic pressure, onto the stack of blanks 10. The blanks are thereby pressed tightly together particularly in the region affected by the holding jaws 30, 31.

Holding jaw 30 is also attached to the common support plate 50, displaceable in an upwards direction against pressure. The upper end of holding jaw 30 is mounted with a carrying rod 53 in a guide body 54 of the support plate 50 so as to be displaceable in a vertical direction. A pressure spring 55 supports holding jaw 30 resiliently on the guide body 54. The relative position of holding jaw 30 is chosen to be such that when it is placed on a lower plane (intermediate layer 22), the elastic pressure of the pressure spring 55 becomes effective. The carrying rod 53 is here pushed upwards relative to the support plate 50. A switch tab 56, disposed on the upper end of the carrying rod 53, here actuates an end switch 57 or a contactless sensor on the upper side of the support plate 50. By this process, the downward movement of the pick-up head 29 is switched off. The holding jaws 30, 31 have reached the lower end position. This is determined by the fact that the holding jaws 30, 31 are supported on the same base as that on which the stacks of blanks 10 also lie.

Figure 5:
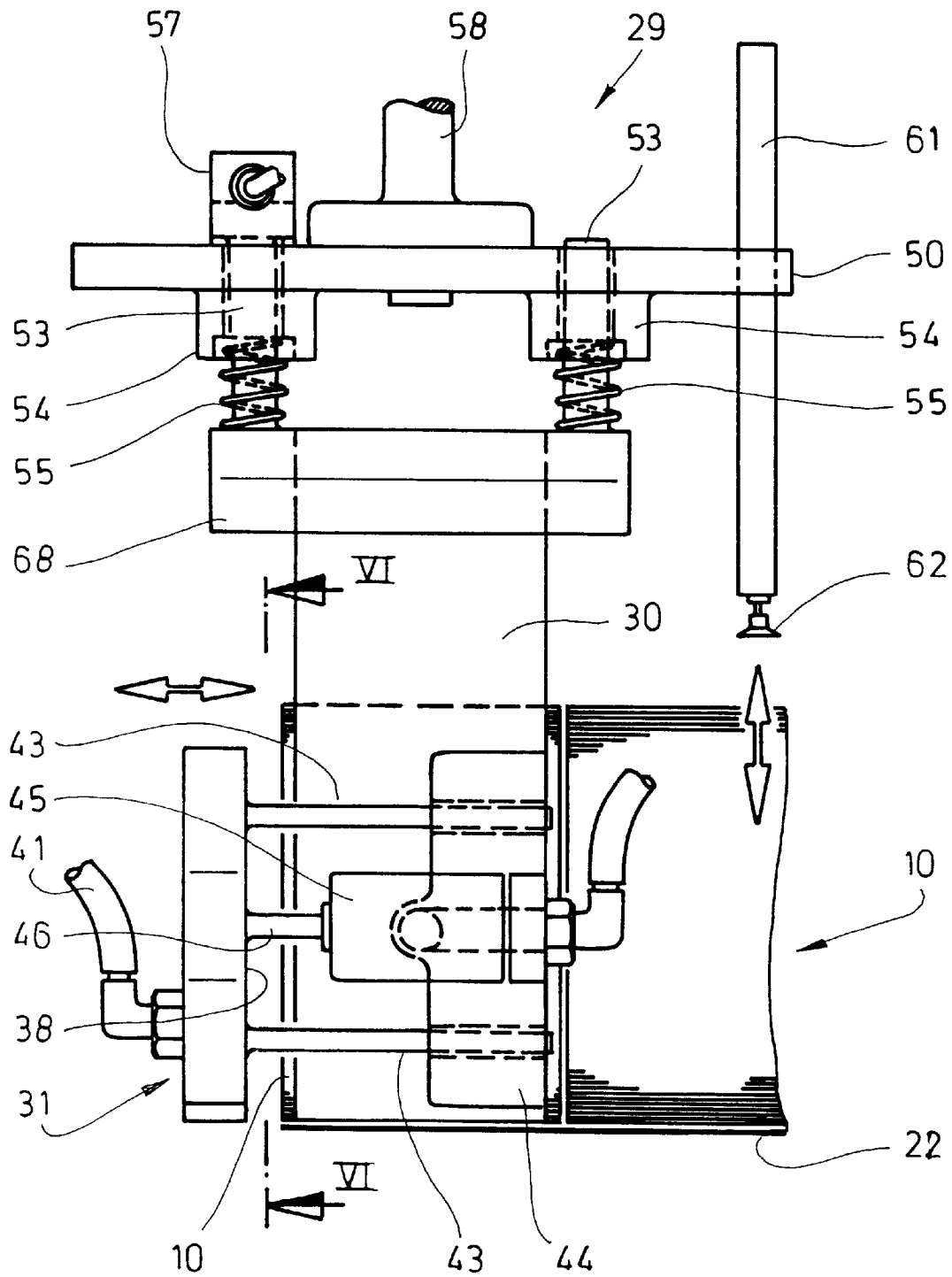
FIG. 5 a side view of the pick-up head displaced by 90° in relation to FIG. 2.
Figure 6:
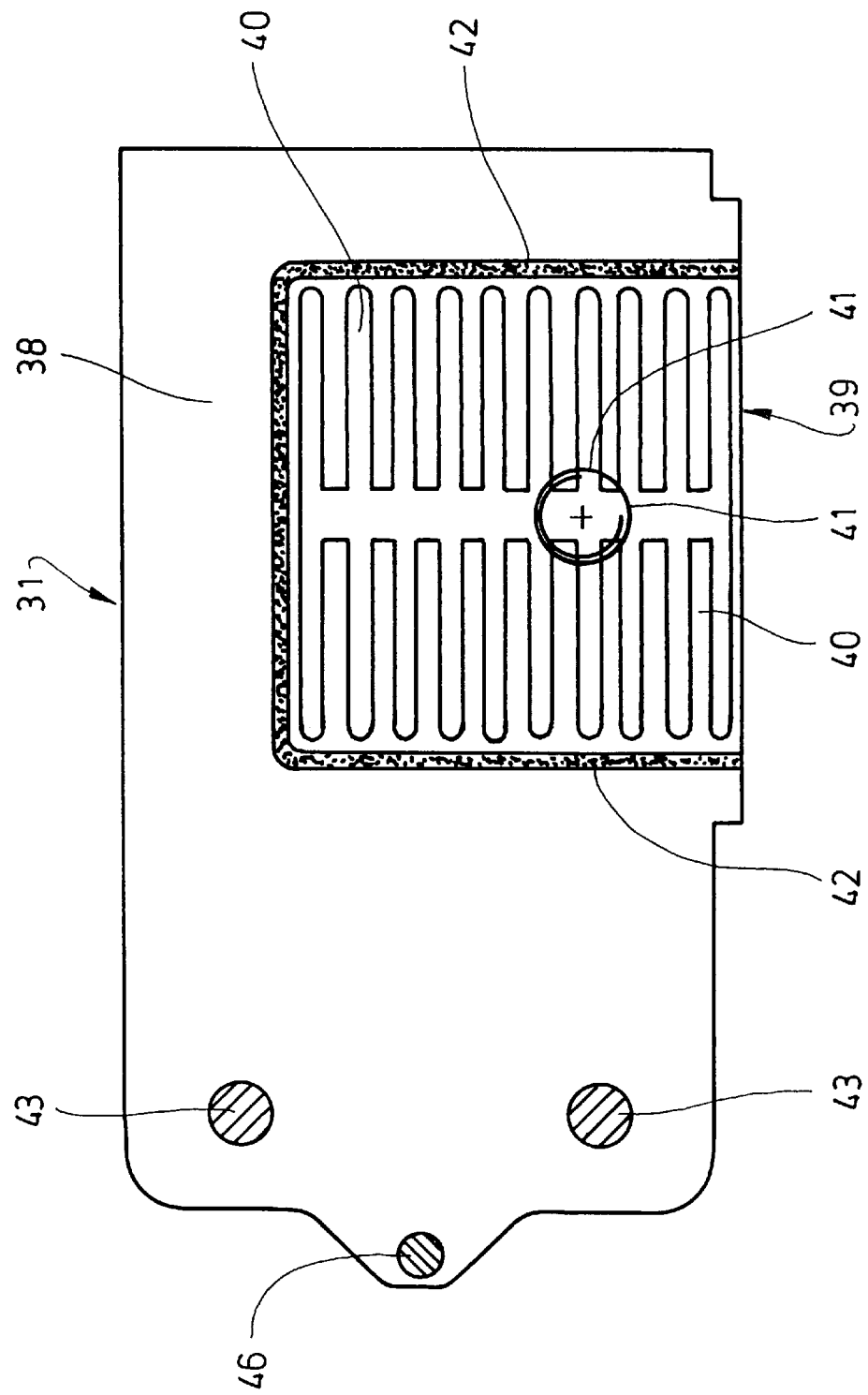
FIG. 6 a detail of the pick-up head in a sectional or sight plane VI—VI of FIG. 5.

In the present embodiment, two carrying rods 53 are provided, disposed at a distance from one another, for mounting and holding the holding jaw 30 on the support plate 50 (FIG. 5). The lower ends of the carrying rods 53 are connected to one another by a transverse crossrail 68. Holding jaw 30 is attached to the latter.

The described handling of the stacks of blanks 10 proceeds automatically. The necessary movements—apart from the movement of holding jaw 31—are effected as movements of the depalletizing device 25 or of the robot via its central control unit. The support plate 50 is connected to the end of the articulated arm 28 by an upright rod-shaped carrying member 58. This carrying member 58 can be rotated around a vertical axis—controlled by the depalletizing device 25.

A sensor 59, which controls the most important movements of the pick-up head 29, is attached to the support plate 50. The sensor 59 can be configured as an optoelectronic or laser-operated sensor. After a new, filled pallet 19 has been delivered to the mv emptying station, according to FIG. 1, the important data of the pallet 19 are first scanned. To this end, the pick-up head 29 or the support plate 50 are moved at a certain, predetermined distance above the upper layer 21. During this movement, the contours of the pallet 19 or of the load are scanned. The sensor 59 can establish the height of the load, i.e. the number of layers 21 above one another. Where there are incomplete layers 21 or incomplete rows 20, the sensor can also recognize this contour of the upper side. The established data are then stored in a central computer to control the depalletizing device 25.

The sensor 59 then controls the movement of the pick-up head 29 in a horizontal plane in such a way that the pick-up head is driven into a position above the stack of blanks 10 which is to be picked up first. Here, the stack of blanks 10 positioned on a free corner of the upper layer 21 comes into consideration, on which stack the side surface 11 and end surface 14 are exposed because of its relative position.

Figure 2:
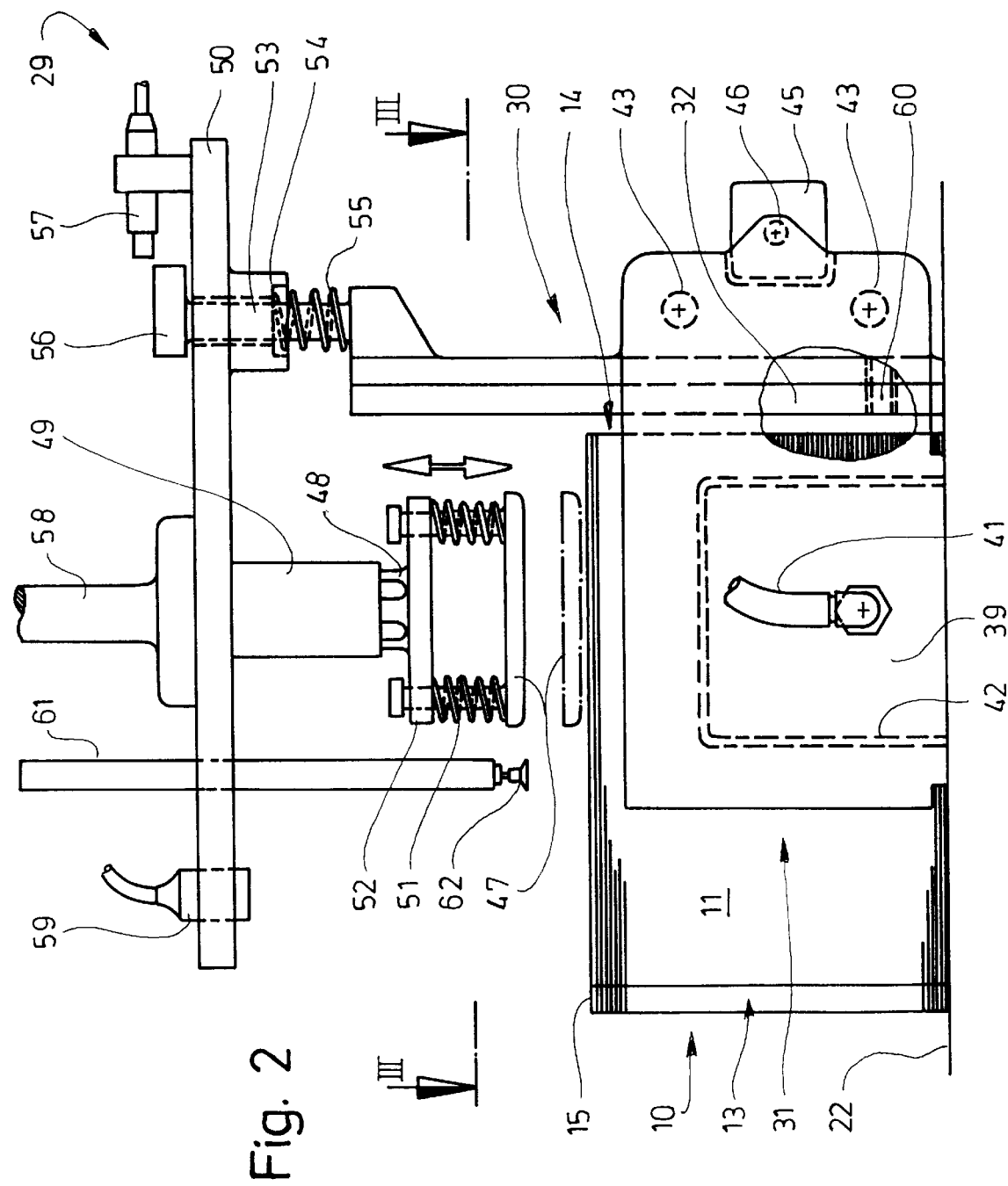
FIG. 2 a pick-up head of the device in simplified side view.
Figure 3:
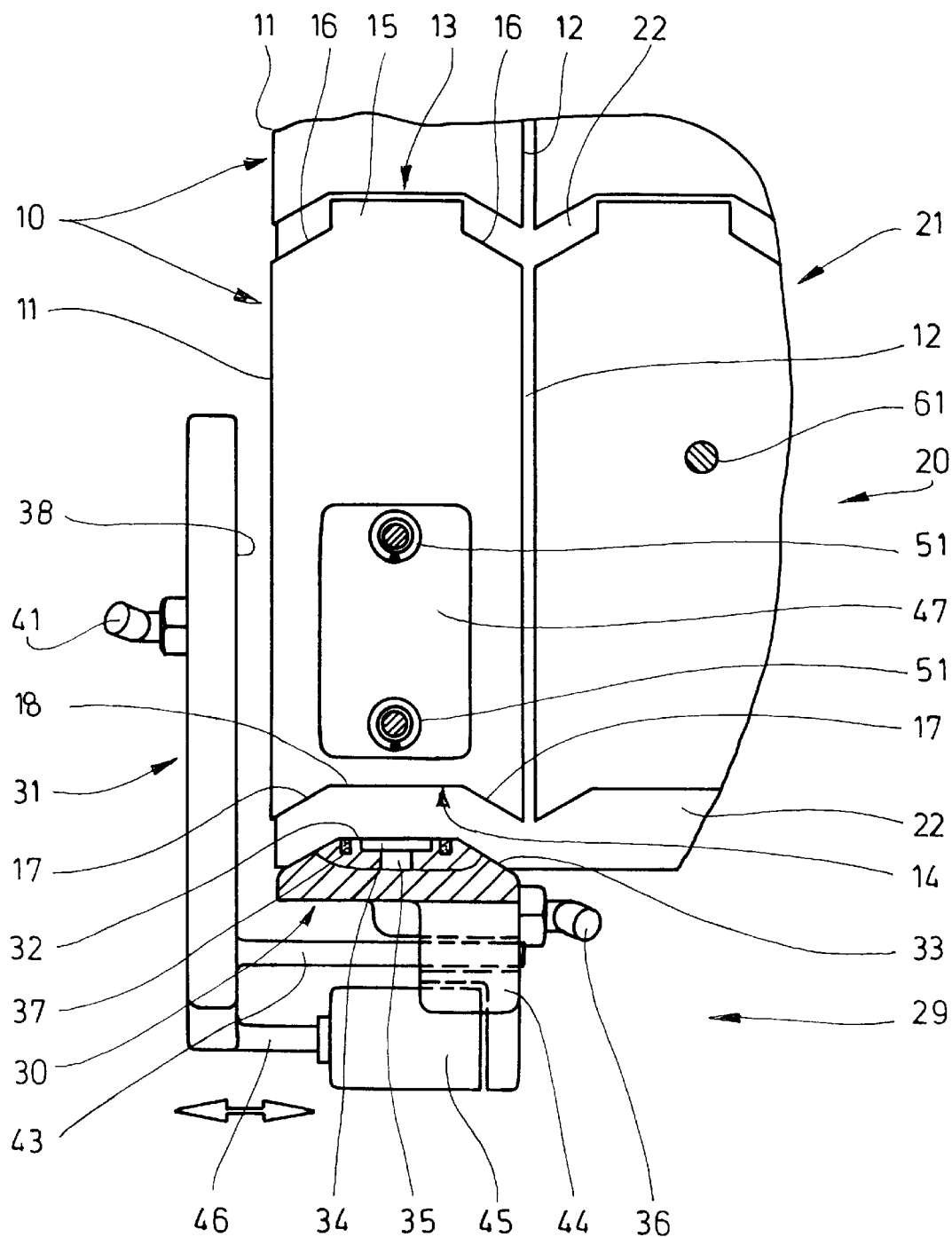
FIG. 3 details of the pick-up head according to FIG. 2 in plan view or horizontal section in plane III—III of FIG. 2, FIG. 4 a view analogous to FIG. 3 with an altered relative position of the pick-up head,.

When it reaches its starting position above the stack of blanks 10, the pick-up head 29 is lowered into the position according to FIG. 2 or FIG. 3. The lowering movement is ended by the cooperation of switch tab 56 and end switch 57. Then the whole pick-up head 29 is moved in a horizontal direction towards the stack of blanks 10. This horizontal movement is controlled via a further sensor 60 which is disposed in the lower region of holding jaw 30, in a horizontal hole of same The sensor 60 ends the horizontal movement of the pick-up head 29 or holding jaw 30 when the latter has come into contact with the end surface 14.

Next, the cylinder 45 is actuated in such a way that holding jaw is moved until it is in contact with side surface 11. Both holding jaws 30 and 31 are now connected to a vacuum source so that suction force is transmitted to the surfaces of the stack of blanks 10.

Figure 4:
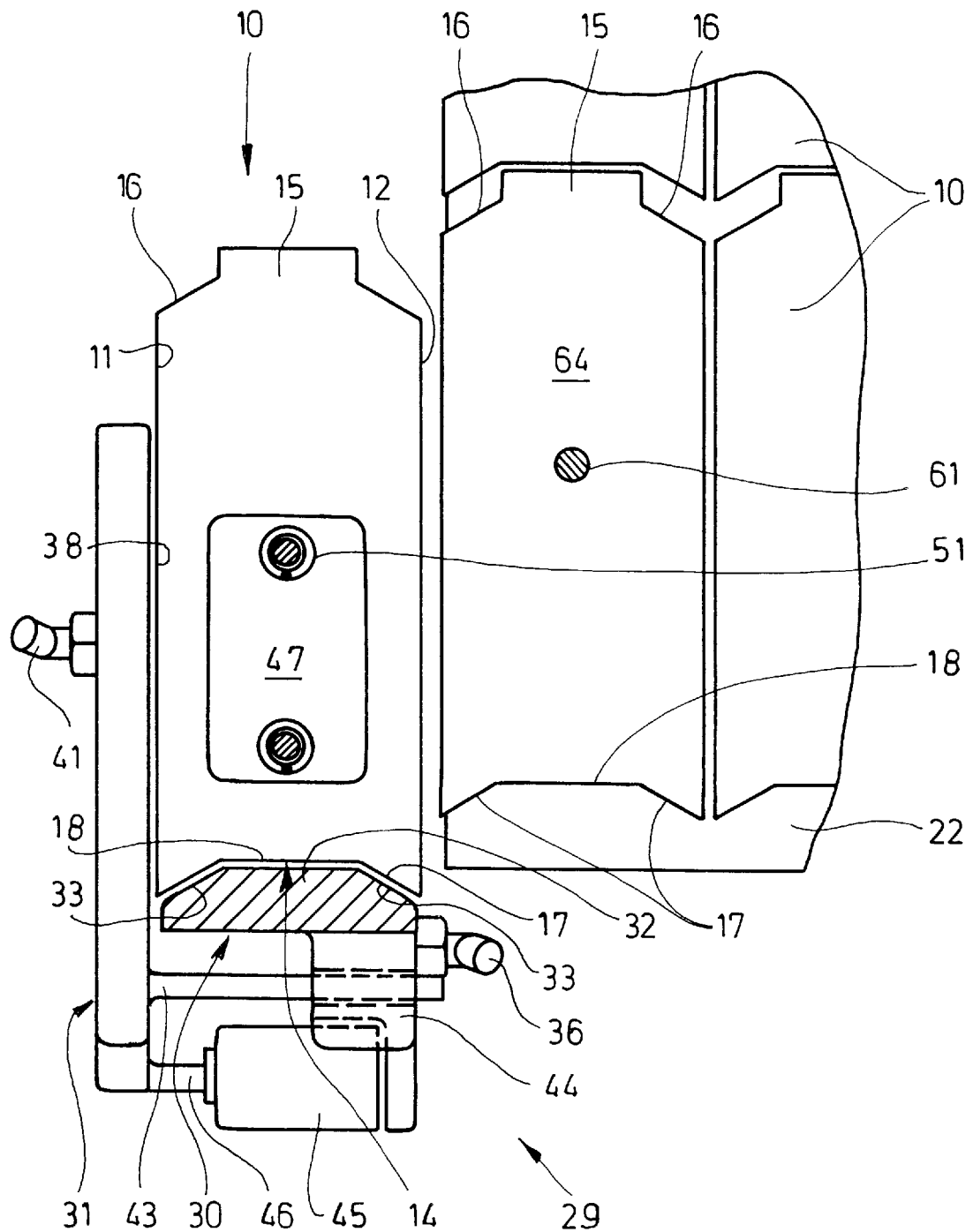

Once it has grasped a stack of blanks 10, the pick-up head is first raised with the stack of blanks 10 and then driven into an intermediate side position as in FIG. 4. The stack of blanks 10 which has been grasped now lies above the original position of same, displaced to the free side. In this position, a member for picking up a lower blank 64, installed as a precaution, can become effective. This member is a lifting device 61 for individual lower blanks 64 which have been left behind on the intermediate layer 22 and not grasped by the holding jaws 30, 31. The lifting device 61 is designed as an elongated, upright member and attached to the support plate at the side—at a distance from the holding jaws 30, 31. To the lower end of the lifting device 61 there is attached a suction device 62 which grasps the blank 64 which has been left behind approximately in the centre and lifts it up so that the stack of blanks 10 is completely removed.

The individual blank can be separately disposed of or also laid on the conveyor 24—together with the stack of blanks 10. In the present embodiment, a collecting receiver 65 for the individual blanks 64 is provided at the loading end of the conveyor. The collecting receiver 65 is fixed in position, at a distance from the adjacent stack of blanks 10 which corresponds to the distance of this stack between the holding jaws 30, 31 from the lifting device 61. When a stack of blanks 10 is thereafter deposited on the conveyor 24, if a blank which has possibly been lifted with the lifting device 61 is located above the collecting receiver 65, it can accordingly be deposited at the same time as the stack of blanks 10. The individual blanks 64 are collected in the collecting receiver 65 until such time as a complete stack of blanks suitable for being carried away by the conveyor 24 is obtained. The collecting receiver 65 is provided with holding pieces 66 and 67 on opposite sides, corresponding in contour to the facing sides, i.e. the head surface 13 and the end surface 14 of the stacks of blanks 10. The blanks 64 are thereby held as a form-fit in the collecting receiver 65.

The lifting device 61, or its suction device 62, is connected to a separate vacuum pipe and may be controlled separately. The vacuum of the suction device 64 is here measured to be such that only a single individual blank can be picked up. The pick-up head 29 is controlled in such a way that, in its working cycle, i.e. after each stack of blanks 10 has been taken off the pallet 19, an interim position as in FIG. 4 is assumed, i.e. beside the previous position of the stack of blanks 10 which has been picked up. The pick-up head 29 is here lowered slightly so that the lifting device 61 can grasp any blank 64 which may have been left behind. If there is no blank lying there, the suction device comes into contact with the intermediate layer 22. However, the suction force is not sufficient to raise this intermediate layer.

Passing the pick-up head 29 to the individual additional stacks of blanks 10 takes place preferably on the basis of the scanned and stored movement program of the pick-up head 29. Alternatively, however, it is also possible for the sensor 57 to become effective again each time a stack of blanks 10 is picked up, i.e. for it to scan each stack of blanks 10 in respect of its position, before the pick-up head 29 is lowered into the receiving position for the stack of blanks. A further alternative consists in the layer of stacks of blanks 10 being scanned in rows and the position of the stacks of blanks 10 within the individual rows 20 being stored as the movement program of the pick-up head 29.

What is claimed is:

1. In a device for picking up and carrying away stacks of blanks (10) for fabrication of packs, the blanks being arranged above one another, a plurality of stacks of blanks (10) being positioned in rows (20) beside one another on a base, and, wherein, for picking up individual stacks of blanks, a pick-up head (29), disposed on a pivoting arm, grips each stack of blanks (10) and deposits the stacks on a conveyor (24), the improvement wherein:

a) the pick-up head (29) has a holding jaw (31) which rests on a lateral upright surface of each stack of blanks (10);

b) the holding jaw (31) has a holding surface (38) which is in contact with a side surface (11) of the stack and holds the stack by suction;

c) the holding surface (38) has a suction surface (39) which is connected to a suction source;

d) the suction surface (39) has suction slits (40) for transferring suction to the stack (10);

e) the suction surface (39) is surrounded by a profiled joint (42) for sealing contact with the stack (10); and f) the suction surface (39) extends to a lower edge of the holding surface of the holding jaw (31).

2. Device according to claim 1, characterized in that for a stack of blanks (10) to be picked up by the holding jaw, a pressure member is lowered onto an upper side of the stack of blanks (10).

3. Device according to claim 1, characterized in that the pick-up head (29) is moved exclusively by an articulated arm (28) of the device (25), a control unit of the device being controllable by a sensor (59) attached to the pick-up head (29), which sensor constantly scans loading of the base (19) and stores necessary data for picking up the individual stacks of blanks (10).

4. Device according to claim 1, characterized in that the pick-up head (29) has a separate member for grasping and taking individual blanks off the base.

* * * * *

UNITED STATES PATENT AND TRADEMARK OFFICE
CERTIFICATE OF CORRECTION

PATENT NO. : 6,022,187
DATED : February 8, 2000
INVENTOR(S) : Heinz FOCKE and Harald FREUDENBERG It is certified that error appears in the above-identified patent and that said Letters Patent is hereby corrected as shown below:

[73] Assignee: Focke & Co. (GmbH & Co.), Verden, Germany

Signed and Sealed this

Fifteenth Day of May, 2001

Attest:

NICHOLAS P. GODICI

Attesting Officer

Acting Director of the United States Patent and Trademark Office